United States Patent [19]

Wyatt

[11] 4,285,827

[45] Aug. 25, 1981

[54] EMULSIFIED FILM FORMING POLYMER AND METHYLENE CHLORIDE/WATER PAINT STRIPPER

[75] Inventor: Sidney G. Wyatt, Mitcham, England

[73] Assignee: R.J. Hamer Limited, Mitcham, England

[21] Appl. No.: 67,170

[22] Filed: Aug. 16, 1979

[30] Foreign Application Priority Data

Aug. 24, 1978 [GB] United Kingdom ............... 34545/78

[51] Int. Cl.$^3$ .......................... C11D 7/50; C11D 7/44; C11D 7/30
[52] U.S. Cl. ..................................... 252/165; 134/38; 252/163; 252/164; 252/174.23; 252/174.24; 252/DIG. 3; 252/DIG. 8
[58] Field of Search .................. 252/DIG. 3, DIG. 8, 252/163, 164, 167–170, 174.23, 174.24, 165; 134/38

[56] References Cited

U.S. PATENT DOCUMENTS

| | | | |
|---|---|---|---|
| 2,433,517 | 12/1947 | Kuentzel | 252/DIG. 8 X |
| 2,705,207 | 3/1955 | Stevens | 252/DIG. 8 X |
| 3,574,123 | 4/1971 | Laugle | 134/38 X |
| 3,600,322 | 8/1971 | Morison | 252/DIG. 8 X |
| 3,702,304 | 11/1972 | Esposito | 252/DIG. 8 X |
| 4,120,810 | 10/1978 | Palmer | 252/163 X |

OTHER PUBLICATIONS

Bennett, *The Chemical Formulary*, vol. XIII, Chemical Publishing Co., Inc., New York, 1967, pp. 190–197.

*Primary Examiner*—Harris A. Pitlick
*Attorney, Agent, or Firm*—Brady, O'Boyle & Gates

[57] ABSTRACT

A method of making a paint stripper comprising mixing a water soluble cellulose gum e.g. hydroxy ethyl cellulose or ethyl cellulose, with water and with a film forming polymer e.g. an acrylic polymer, vinyl acrylic polymer, or vinyl acetate polymer, vinyl acetate copolymer, and adding to the resulting emulsion a mixture of methylene chloride and a cellulose gum which is soluble therein, e.g. ethyl cellulose or hydroxy propyl cellulose.

The invention is from another aspect a paint stripper comprising methylene chloride emulsified in the presence of a film forming polymer.

6 Claims, No Drawings

EMULSIFIED FILM FORMING POLYMER AND METHYLENE CHLORIDE/WATER PAINT STRIPPER

The invention relates to a chemical stripper for removing surface coatings e.g. paints and textured finishes.

Many chemical strippers suffer from the disadvantage that because the active ingredient, usually methylene chloride, is volatile and gives off a vapour which can be harmful to humans, the strippers cannot be used freely in confined spaces. Also chemical strippers in which the active ingredient is volatile tend to dry quickly on exposure to air so that it is difficult or impossible to remove thick or hardened layers of coating in one application of stripper. Also the effectiveness of known paint strippers is often limited by the fact that the stripper frequently causes rapid "bubbling" of the surface of the coating to be removed, which bubbling inhibits the continued effectiveness of the stripper.

It is an object of the invention to mitigate against these disadvantages and to provide a chemical stripper which is effective on different types of surface coatings such as air drying or stoving finishes as well as emulsion paint. It is a particular object of the invention to provide a chemical stripper which is effective on emulsion textured finishes (e.g. acrylic, vinyl acrylic, vinyl acetate copolymer and poly vinyl acetate finishes) and wallpaper which has been coated with emulsion paint. We have found that although some known chemical strippers will soften emulsion paint they will not satisfactorily wet an underlying paper layer to soften the adhesive securing the paper in position.

For the sake of simplicity a chemical stripper for removing surface coatings according to the invention will be referred to as a paint stripper in the following description.

According to the invention there is provided a paint stripper comprising methylene chloride emulsified in the presence of a film forming polymer. The polymer may be an acrylic polymer, vinyl acrylic polymer, vinyl acetate polymer or co-polymer.

The invention will now be described, by way of example, with reference to a specific embodiment. A paint stripper is prepared by pre-mixing 14.3 parts by weight of a water soluble thickening agent in this case cellulose gum (such as hydroxy methyl or methyl cellulose) with 143 parts by weight of cold water until a complete gell is formed. To the gell is added whilst stirring and 209.84 parts by weight of an acrylic polymer such as that sold by Vinyl Products as Vinacryl 6705. To this mixture is added stirring slowly 101.46 parts by weight of methylene chloride and 13.25 parts by weight of pre-warmed low melting point paraffin wax.

To the resulting emulsion are added while stirring 200 parts by weight of methylene chloride and 10.06 parts by weight of ethyl cellulose or hydroxy propyl cellulose gum. Finally 200 parts by weight of methylene chloride, 8.85 parts by weight of acetone, 13.25 parts by weight of xylene, 70.74 parts by weight of 64 OP methylated spirit (or methanol) and 11.06 parts by weight of ammonia are stirred into the emulsion. The resulting paint stripping emulsion is of creamy consistency and colour and has less smell then conventional methylene chloride based paint strippers, presumably on account of the "encapsulation" of the methylene chloride. The paint stripper can be applied easily to a surface coating in the conventional manner e.g. by brushing and on account of the low rate of evaporation has been found to remain wet and thus active for extended periods rather than drying out quickly as is the case where the methylene chloride is not in an emulsified form. It has also been found that where the stripper is applied to emulsion-paint coated wallpaper the methylene chloride strips the emulsion paint and the water phase penetrates the paper to dissolve or soften the adhesive so that the paper can be removed easily.

It will be appreciated that the thickening agent used in the pre-mix may be varied depending on the required viscosity for example between 10 and 15 parts by weight and similarly the film forming polymer may be varied for example between 180 and 225 parts by weight according to the particular type which is being used and its solids content. Also the amount of ethyl cellulose or hydroxy propyl cellulose gum thickening agent added to the mixture may be varied according to the desired viscosity of the stripper e.g. between 7 and 12 parts by weight.

Since in a paint stripper according to the invention, the methylene chloride is used more effectively than in conventional paint strippers, it is possible to reduce the volume of the solvent present in the stripper e.g. from the conventional 80% to around 45%, with a consequent reduction of the overall cost of the paint stripper.

I claim:

1. A paint stripper comprising an aqueous emulsion of methylene chloride, a film forming polymer selected from the group consisting of acrylic polymers, vinyl acrylic polymers, vinyl acetate polymers, and vinyl acetate copolymers, a cellulose gum soluble in the methylene chloride and a water soluble cellulose gum.

2. A paint stripper according to claim 1, wherein the water soluble cellulose gum is selected from the group consisting of hydroxy cellulose and methyl cellulose.

3. A paint stripper according to claim 1, wherein the cellulose gum soluble in methylene chloride is selected from the group consisting of ethyl cellulose and hydroxy propyl cellulose.

4. A method of making a paint stripper comprising mixing a water soluble cellulose gum with water and with a film forming polymer selected from the group consisting of acrylic polymers, vinyl acrylic polymers, vinyl acetate polymers and vinyl acetate copolymers to form an emulsion, and adding to the emulsion a mixture of methylene chloride and a cellulose gum which is soluble therein.

5. A method of making a paint stripper according to claim 4, wherein the water soluble cellulose gum is selected from the group consisting of hydroxy methyl cellulose and methyl cellulose.

6. A method of making a paint stripper according to claim 4, in which the cellulose gum soluble in methylene chloride is selected from the group consisting of ethyl cellulose and hydroxy propyl cellulose.

* * * * *